United States Patent [19]

Perreault

[11] 4,027,258
[45] May 31, 1977

[54] TIME DOMAIN AUTOMATIC EQUALIZER WITH FREQUENCY DOMAIN CONTROL

[75] Inventor: Donald A. Perreault, Dallas, Tex.

[73] Assignee: Xerox Corporation, Stamford, Conn.

[22] Filed: June 1, 1976

[21] Appl. No.: 691,808

[52] U.S. Cl. .................................. 333/18; 325/42; 333/70 T
[51] Int. Cl.² ............................................ H03H 7/16
[58] Field of Search ............... 333/16, 18, 70 T; 325/42, 65; 324/77 B

[56] References Cited

UNITED STATES PATENTS

| | | | |
|---|---|---|---|
| 3,375,473 | 3/1968 | Lucky | 333/18 |
| 3,614,673 | 10/1971 | Kang et al. | 333/18 |
| 3,851,162 | 11/1974 | Munoz | 324/77 B X |

*Primary Examiner*—Paul L. Gensler

[57] ABSTRACT

An automatic equalizer for calculating the equalization transfer function and applying same to equalize signals received from a transmission channel. Time domain equalization is achieved using a transversal filter whose tap weights are calculated in the frequency domain during an initial training period.

24 Claims, 10 Drawing Figures

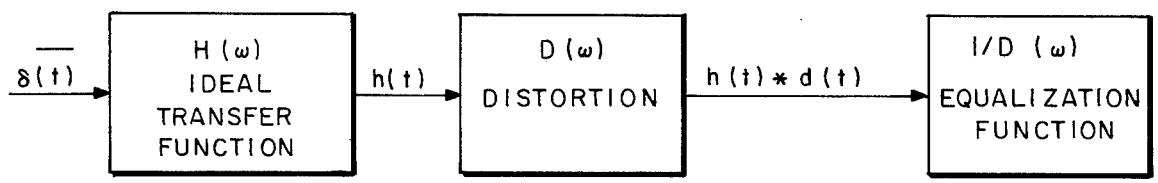
FIG. 1
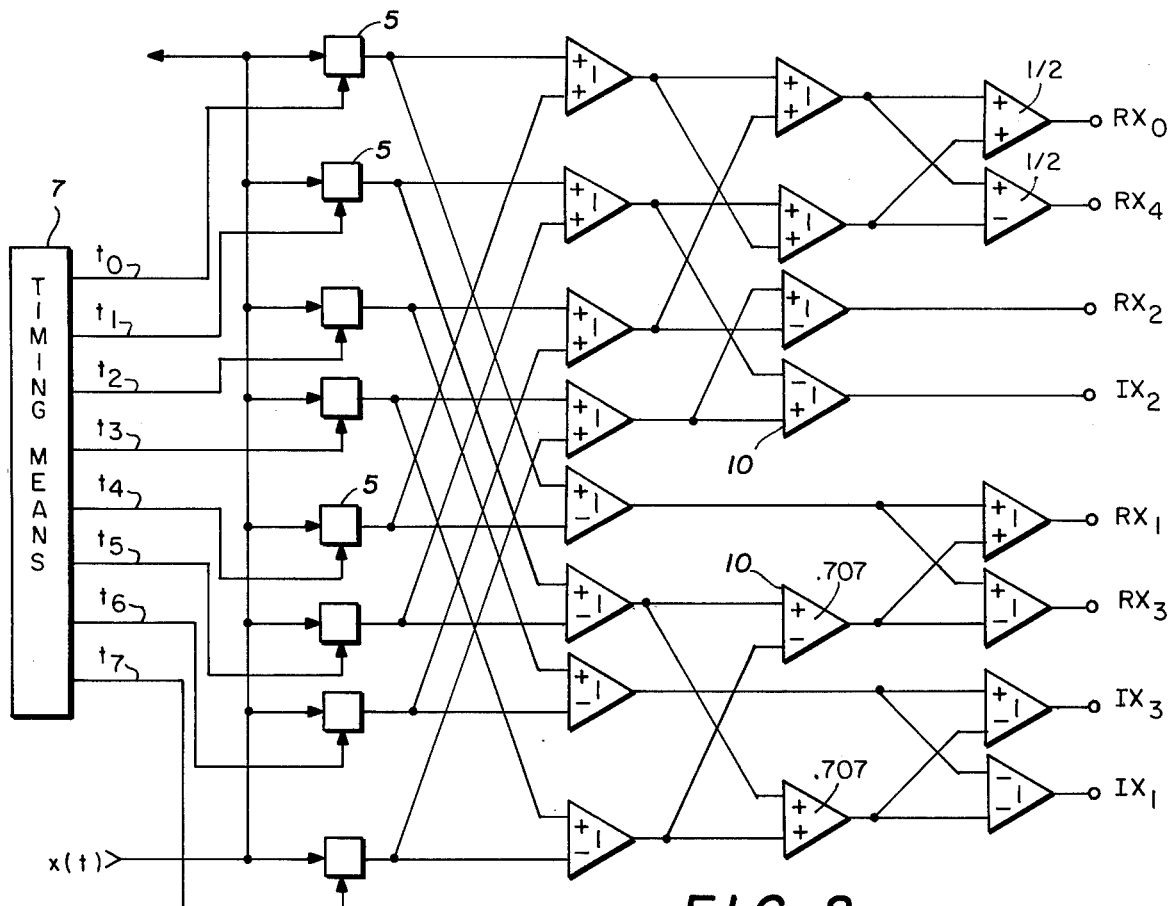
FIG. 2
FIG. 3
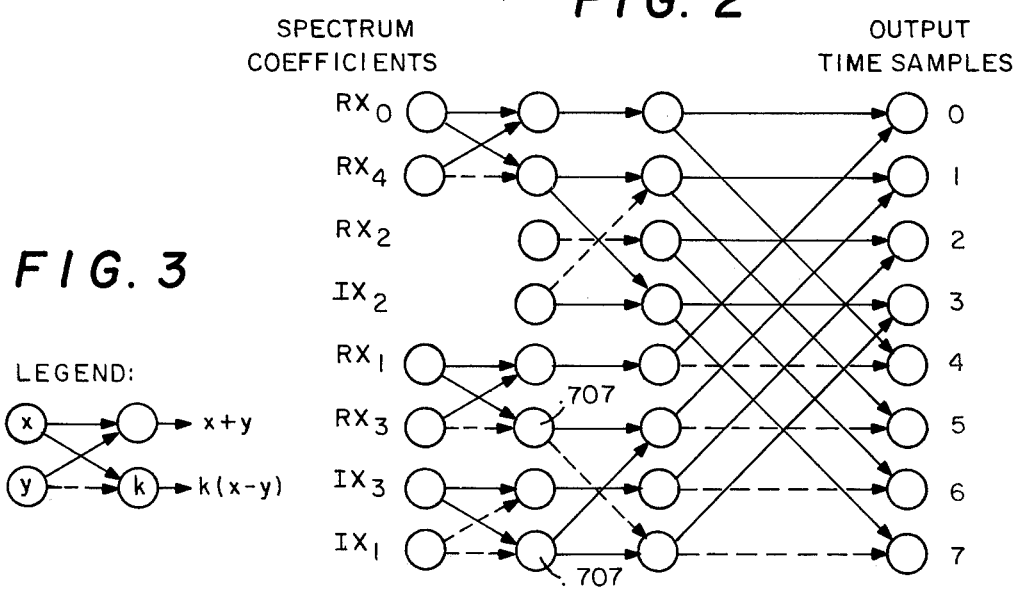

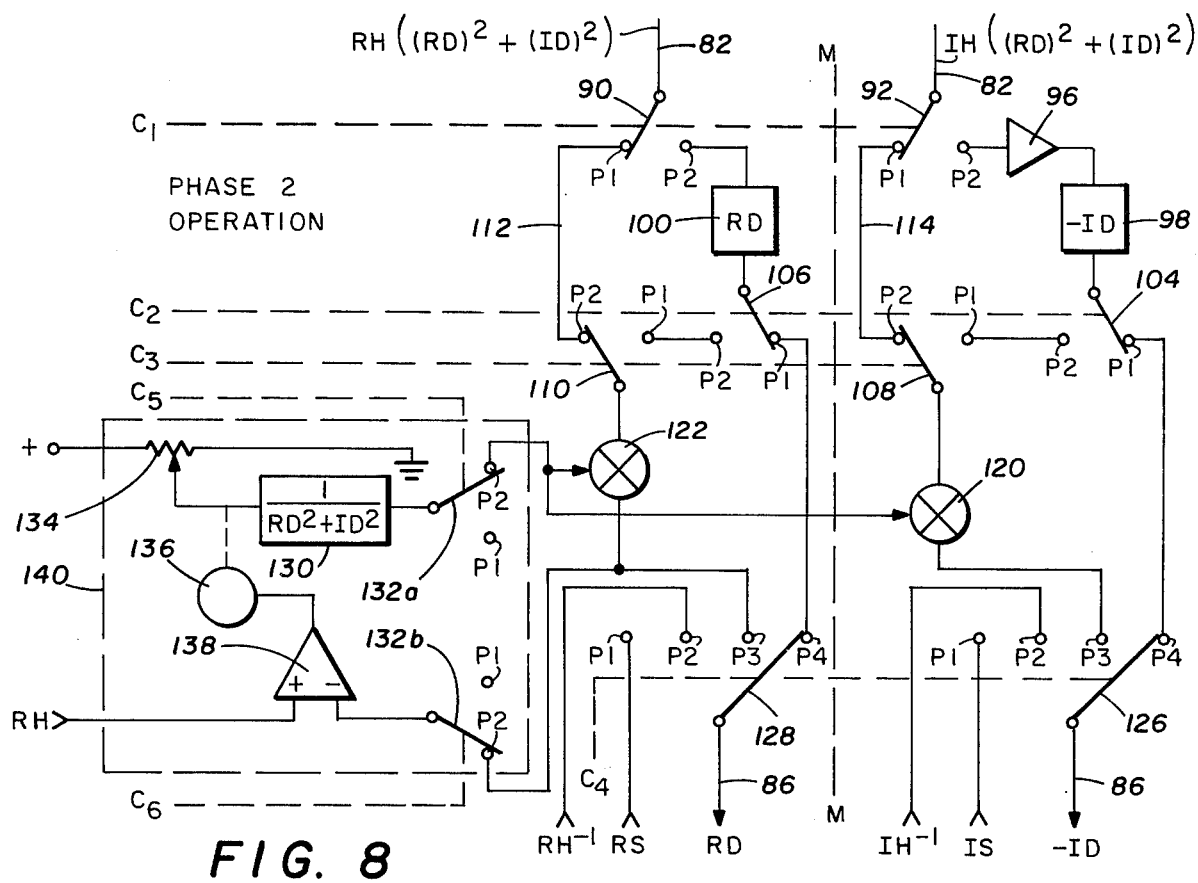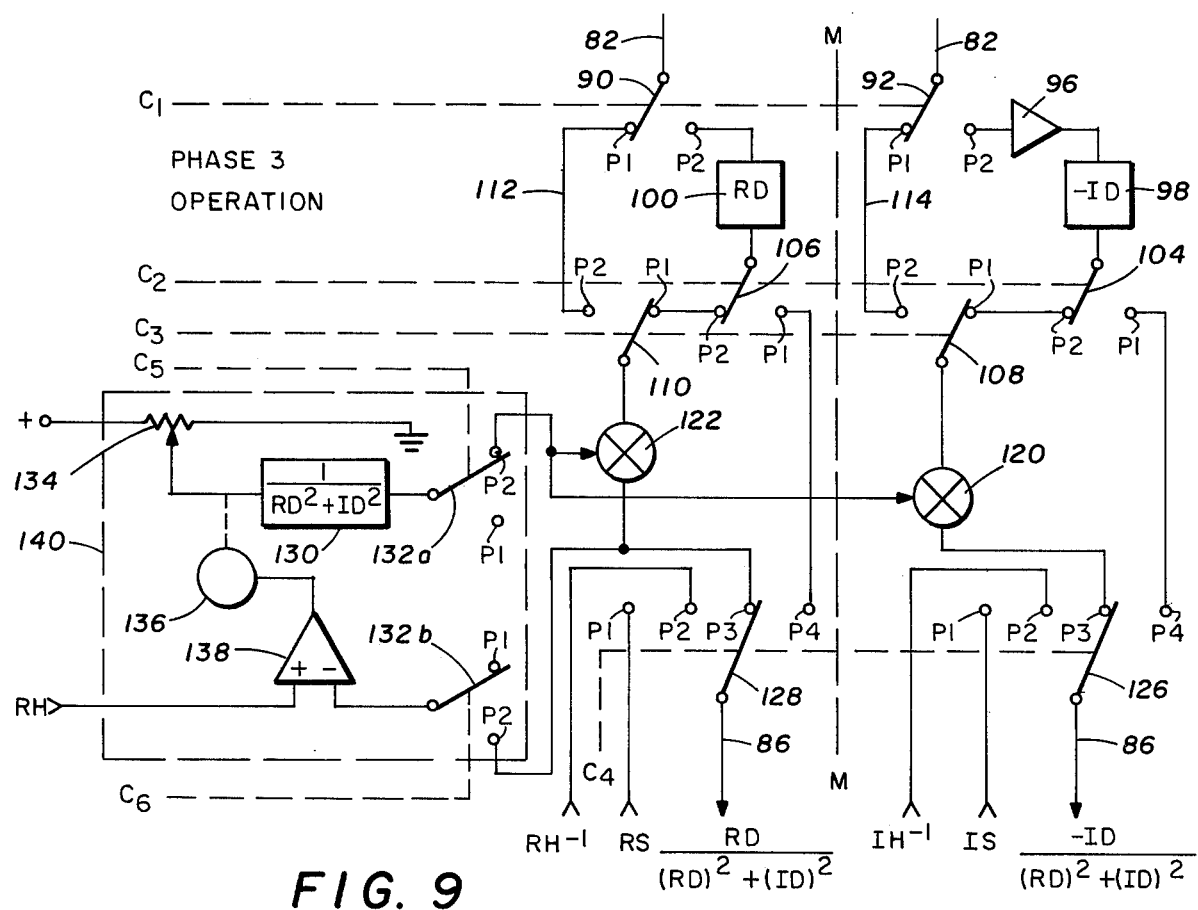

TIME DOMAIN AUTOMATIC EQUALIZER WITH FREQUENCY DOMAIN CONTROL

BACKGROUND OF THE INVENTION

1. Field of the Invention

The invention pertains to frequency-domain automatic equalization for electrical signals used in transmission of information.

2. Description of the Prior Art

Ideally, it is desirable to transmit electrical signals such that no interference occurs between successive symbols. In practice, however, transmission channels are bandlimited and intersymbol interference is controlled utilizing clocked systems with equalization conventionally performed in the time domain.

Most conventional automatic equalizers operate in a feedback mode so that the effects of changes in the equalizer transfer function are monitored and used to produce further changes in the transfer function to obtain the best output signals. In such systems, the measurements of the output signal are made in the time domain. Typically, the transfer function may be constructed in the time domain by adjusting the tap gains of a tapped delay line during an initial training period prior to actual message transmission. Examples of such systems are shown in U.S. Pat. Nos. 3,375,473 and 3,292,110.

Frequency domain equalization utilizing time domain adjustments are shown, for example, in the U.S. Pat. No. 3,614,673 issued to George Su Kang. Kang utilizes frequency domain measurement and calculations to produce the time domain impulse response of a transversal filter. The impulse response of the transversal filter is applied to set the weights of the transversal filter.

SUMMARY OF THE INVENTION

The principal object of the invention is to provide a time domain automatic equalizer which is controlled in the frequency domain.

Another object of the invention is to provide a means for directly calculating the transfer function of the equalizer utilizing output samples of a transversal filter and applying the calculated inverse transform of the equalizer transfer function to set the transversal filter weights.

The output of the transversal filter is sampled during an initial training period prior to message transmission to provide discrete sample sets for input to circuitry performing a discrete Fourier transformation (DFT). Once transformed into the frequency domain, the spectral coefficients are modified in a three-phase feedback system with the transversal filter to provide a frequency corrected set of spectral coefficients. The inverse discrete Fourier transformation (IDFT) of these corrected spectral coefficients is then utilized to directly set the tap gains of the transversal filter to complete the setup procedure and enable message transmission.

In particular, the equalizer of the invention comprises a transversal filter having a plurality of taps which are separated by a time interval $\tau$. The transversal filter receives input signals from the transmission channel which has a distortion transfer function given by $D(w)$. The output of the transversal filter is sampled at sampling intervals $\tau$, and the resulting sampled set is transformed into a frequency representation. The sample set frequency representation is used together with a frequency representation associated with the ideal, undistorted transfer function to provide a transfer function substantially equal to $1/D(w)$. The inverse transform of this transfer function $1/D(w)$ is then taken to provide a time domain sample set which is applied directly as weights for the taps of the transversal filter to thereby produce the time domain equalization of the transmission channel.

More particularly, the invention pertains to an apparatus for adjusting the tap gains of a transversal filter having an input and an output in equalizing distortion through a transmission channel upon response to a sequence of at least two predetermined training pulses. $H(w)$ is the known, ideal, i.e. undistorted, transfer function of the transmission channel and $D(w)$ is the distortion transfer function such that the transfer function of the transmission channel is given by $H(w) \cdot D(w)$. The tap gains of the transversal filter are ultimately adjusted to correspond to a transfer function of the transversal filter substantially given by $1/D(w) = D^*(w)/((RD)^2 + (ID)^2)$, where, $D^*(w)$ is the complex conjugate of D, RD is the real part of D and ID is the imaginary part of D. The apparatus specifically comprises means for initially setting the tap gains of the transversal filter to correspond to the transfer function $1/H(w)$, whereby the output of the transversal filter has a frequency spectrum $H(w) \cdot D(w) \cdot 1/H(w) = D(w)$, means responsive to receipt of the first training pulse from the transversal filter for generating values corresponding to $D^*(w)$ and for storing same, means for setting the tap gains of the transversal filter to correspond to the transfer function $D^*(w)$ whereby the output of the transversal filter has a frequency spectrum $H(w) \cdot D(w) \cdot D^*(w) = RH((RD)^2 + (ID)^2) + jIH((RD)^2 = (ID)^2)$ where $j = \sqrt{-1}$ and RH and IH are the real and imaginary parts respectively of the undistorted transfer function $H(w)$, means responsive to receipt of the second training pulse from the transversal filter and to the undistorted transfer function $H(w)$ for generating and storing values corresponding to $1/((RD)^2 + (ID)^2)$, means for multiplying together the stored values $D^*(w)$ and $1/((RD)^2 + (ID)^2)$ to obtain $1/D(w)$, and means for setting the tap gains of the transversal filter to correspond to the transfer function $1/d(w)$ whereby time domain equalization of the received signals from the transmission channel is produced in the transversal filter.

BRIEF DESCRIPTION OF THE DRAWINGS

These and other features and advantages of the invention will become apparent when taken in conjunction with the following specification and drawings wherein:

FIG. 1 is a block diagram of the overall theoretical model used in the instant invention;

FIG. 2 is an analog circuit for performing the discrete Fourier transform of a sample set;

FIG. 3 illustrates a tree graph for the inverse discrete Fourier transform;

FIG. 8 is a block schematic diagram of the frequency domain control circuits in the phase two, setup condition;

FIG. 9 is a block schematic diagram of the frequency domain control circuits in the phase three, setup condition.

DETAILED DESCRIPTION OF THE PREFERRED EMBODIMENT

Figure 4:
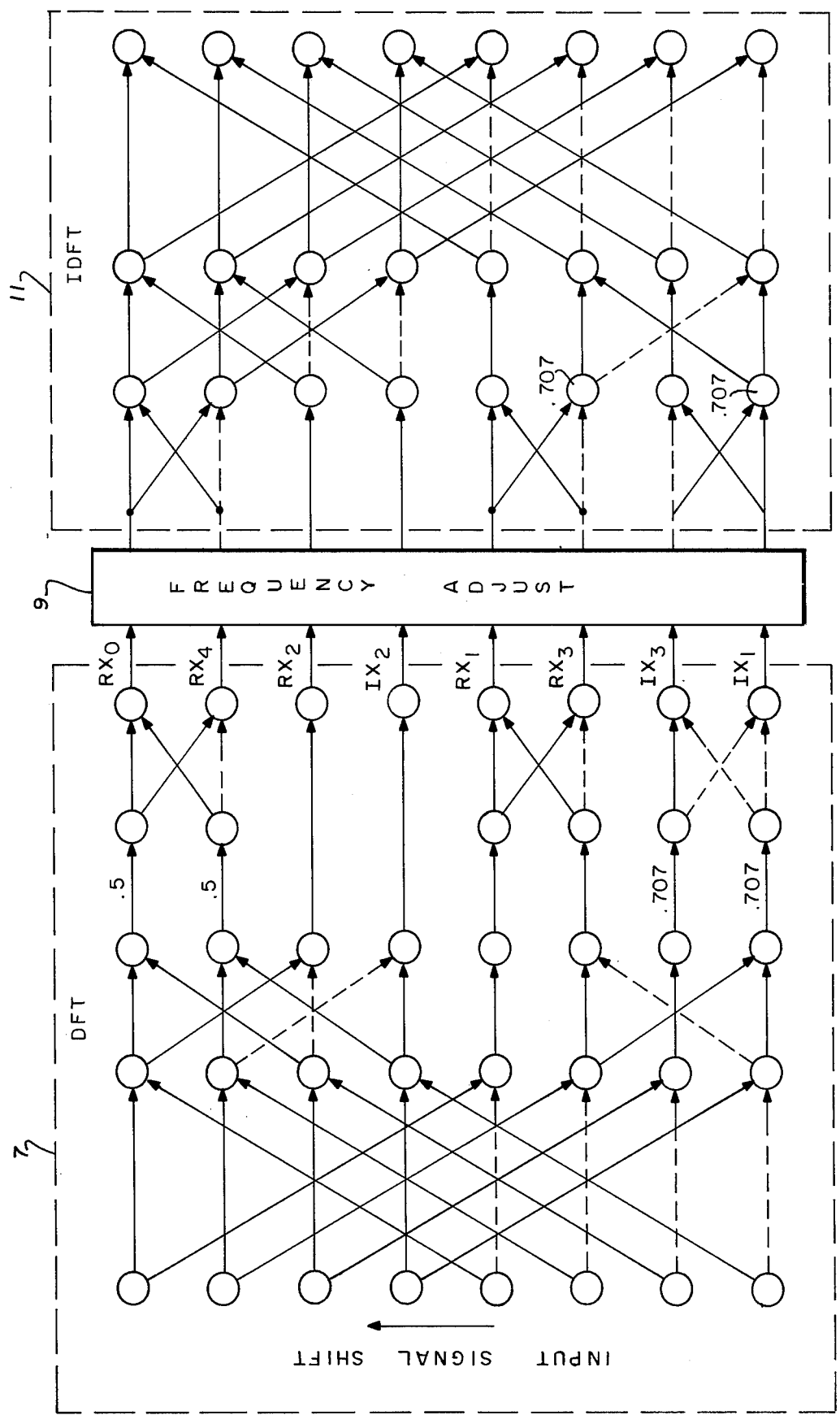
FIG. 4 is a tree graph for the complete frequency domain and control process.

A block diagram of the model of the transmission system is shown in FIG. 1. The system is assumed linear and it is therefore theoretically immaterial where in the system the distorting elements are located. The transfer function H(w) is a composite of all the ideal elements of the system and is shown in cascade with D(w), which is a composite of all the linear distorting elements of the system. It is assumed that the impulse response $h(t)$ is the ideal symbol and that the information is represented by the magnitude and/or polarity of impulses at the input to H(w) which impulses are spaced in time according to the requirements of $h(t)$ and the detection process. The output of the system is the Fourier transform of H(w) × D(w), or the convolution of $h(t)$ and $d(t)$, and is no longer ideal. The equalizer is connected in cascade with the distortion network and functions to eliminate the effects of D(w) i.e. the transfer function of the equalizer is 1/D(w). The equalizer precedes the decision point at the receiver, and the system is capable of determining D(w) and then producing the transfer function 1/D(w) in the transmission path.

To implement the time/frequency transformations, the discrete Fourier transform (DFT) and the inverse discrete Fourier transform (IDFT) are employed. The transform itself may be implemented either in an analog or digital fashion, and the following description, by way of example, is illustrative of an analog transformation. Additionally, the transmitted signal may be real or complex, and, by way of example and for ease of description, the transmitted signal is assumed real in the embodiments set forth therein. FIG. 2 shows an analog discrete Fourier transform (ADFT) circuit which produces a set of electrical signals which represent the real and imaginary coefficients respectively of samples of the Fourier transform, i.e. frequency spectrum, of the input signal. The input to the ADFT circuit comprises a discrete sample set of, for example, eight samples $x_o$, $x_1, \ldots x_7$ of the received signal $x(t)$. The sample set may be taken by sampling the incoming time signal $x(t)$ at intervals, $\Delta t$, and storing the sample values in sample and hold circuits 5. Timing means 7 is utilized to sequentially enable the sample and hold circuits 5 to provide a time sample set of $x(t)$. Each discrete $i^{th}$ sample set $[X]_i = x_o(i), x_1(i), \ldots x_7(i)$ is transformed by the ADFT circuit into the frequency domain and represented by vectors $X_n$ which are generally complex. Real and imaginary parts of the vector are designated $RX_n$ and $IX_n$ respectively. Similarly, RH, IH and RD, ID designate respectively the real and imaginary parts of the respective transfer functions H and D.

FIG. 2 shows a plurality of operational amplifiers 10 having input terminals marked + or − for indicating the additive or subtractive function performed therein. The gain of the amplifiers is indicated by the multiplication factor shown. All amplifiers have unity gain except those having gain 0.707. The ADFT circuit shown in FIG. 2 receives N samples (N=8) of a real input function $x(t)$. For real time samples $x(t)$, the frequency components $X_n$ for $n > N/2$ are the complex conjugates of $X_n$ for $n < N/2$. Additionally, $X_o$ and $X_{N/2}$ are real. Consequently, $X_o$ and $X_4$ have real components only. Non-redundant information is obtained using the real and imaginary parts of vectors $X_1$, $X_2$ and $X_3$. The complex vectors $X_1$, $X_2$ and $X_3$ specify six parameters, and the real vectors $X_o$, $X_4$ give two more parameters yielding a total of eight parameters consistent with the number of sample points of $x(t)$. ADFT circuitry is described more generally, for example, in co-pending application entitled "Frequency Domain Automatic Equalizer Utilizing the Discrete Fourier Transform" filed July 19, 1976, Ser. No. 706,703 and in U.S. Pat. No. 3,851,162 to Robert Munoz, the whole of both references being incorporated herein by reference.

The inverse of the DFT may be performed quite straight-forwardly by reversing the DFT of FIG. 2. The tree graph of the IDFT is shown in FIG. 3 where the input are the real and imaginary spectral components of the non-redundant vectors $X_n$.

FIG. 4 illustrates a tree graph for the complete frequency domain calculation and control process. The DFT of the input sample set $x_o \ldots X_{N-1}$ for N=8 is computed is section 7. The frequency domain spectral computation is done in section 9 and the inverse DFT in section 11. As is readily apparent, section 7 and 11 are identical to FIG. 2 and FIG. 3 respectively. The frequency domain computation is achieved by multiplying each spectral component $X_n$ by a correction factor $C_n$ which is simply a component of the transfer function of the equalizer C(w). Thus, $$Y_n = Y_n \cdot C_n \; n = 0, 1 \ldots N/2. \tag{1}$$

The equalized spectral components, $Y_n$, are then inverse transformed by the IDFT to provide the time domain representation of the input sample set. The time domain representation corresponding to the corrected spectral components $Y_n$ is simply the impulse response of the transversal filter. Consequently, as explained more fully below, the tap gains of the transversal filter may be set to provide time domain equalization of the received signal $x(t)$.

The multiplication in equation (1) is performed component-by-component. Indeed, within the frequency domain the equivalent transfer function of two transfer functions in series is the component-by-component products of the two functions and there are no cross products as in the case of convolutions.

In order to determine the desired equalizer transfer function C(w), one may assume that a plurality of isolated impulse or test signals of known magnitude and polarity is transmitted. The test signals or training signals are transmitted during a training period prior to message transmission. In the following description, two test signals are sequentially transmitted to setup or initialize the equalizer to provide the components $C_n$. The ideal received signal is h(t), the impulse response of H(w). However, the actual received test signal is $f(t)$, the impulse response of $F(w) = H(w) \cdot D(w)$. It is intended that C(w) should equal 1/D(w) or be the best approximation possible. In order to find 1/D(w), one may write:

$$\frac{1}{D(w)} = \frac{1}{RD + jID} = \frac{RD - jID}{(RD)^2 + (ID)^2} = \frac{D^*(w)}{(RD)^2 + (ID)^2} \quad (2)$$

where $j = \sqrt{-1}$ and $D(w)$ is the complex conjugate of $D(w)$. A three-phase initialization or training period is designed to implement equation (2). During initialization, the received training signal is sent through the transversal filter and the output of the transversal filter is sampled and converted into the frequency domain for spectral calculation. The resulting spectral coefficients are transformed into the time domain to re-adjust the tap weights of the transversal filter.

Prior to the training period, the equalizer is in the standby phase, and the transversal filter taps are set to some constant standby value. This standby value may be chosen, from experience, to represent some compromise equalization or may simply be unity. During phase 1, the first training pulse is transmitted and the frequency control circuitry applies reference values to the IDFT which correspond to the inverse of the ideal transfer function. Thus, predetermined values representative of $1/H(w)$ are transformed into the time domain and used to set the weights of the transversal filter receiving the first ideal or training pulse. Since the inpulse response of the transversal filter will now correspond to the transfer function $1/H(w)$, the time domain signal at the output of the transversal filter has a frequency spectrum given by:

$$F(w) = H(w) \cdot D(w) \cdot 1/H(w)$$
$$F(w) = D(w) \quad (3)$$

The time domain output of the filter, $d(t)$, ($d(t) \leftrightarrow D(w)$, where $\leftrightarrow$ represents the time/frequency transformation) is time sampled and passed to the DFT circuitry for producing $D(w)$. The frequency control circuits are effective to produce $D(w)$ as called for in equation (2) and to store $D(w)$ for subsequent use.

During phase 2, the second training pulse is received. The IDFT is performed using the stored values $D^*(w)$ as an input thereto. The taps of the delay line are reset to produce $D^*(w)$ so that upon receipt of the second training pulse, the transversal filter output has a time domain output signal whose spectrum is given by:

$$H(w) \cdot D(w) \cdot D(w) = H(W) \cdot [(RD)^2 + (ID)^2)] = RH$$
$$[(RD)^2 + (ID)^2] + jIH [(RD)^2 + (ID)^2)] \quad (4)$$

In phase 2, the spectrum given by equation (4) is sampled and the frequency coefficients produced using the DFT circuitry. At each sample frequency, $n$, the factor $1/((RD)^2 + (ID)^2)$ is produced by comparing the received spectral coefficients $RH[(RD)^2 + (ID)^2]$ with the known value $RH$, and the value $1/((RD)^2 + (ID)^2)$ is stored.

During phase 3, the stored value $D(w)$ is multiplied with the stored value $1/((RD)^2 + (ID)^2)$ as per equation (2) and the result, $1/D(w)$, is transformed into the time domain by the IDFT circuitry to reset the weights of the transversal filter. The transversal filter now provides the desired time equalization.

Figure 5:
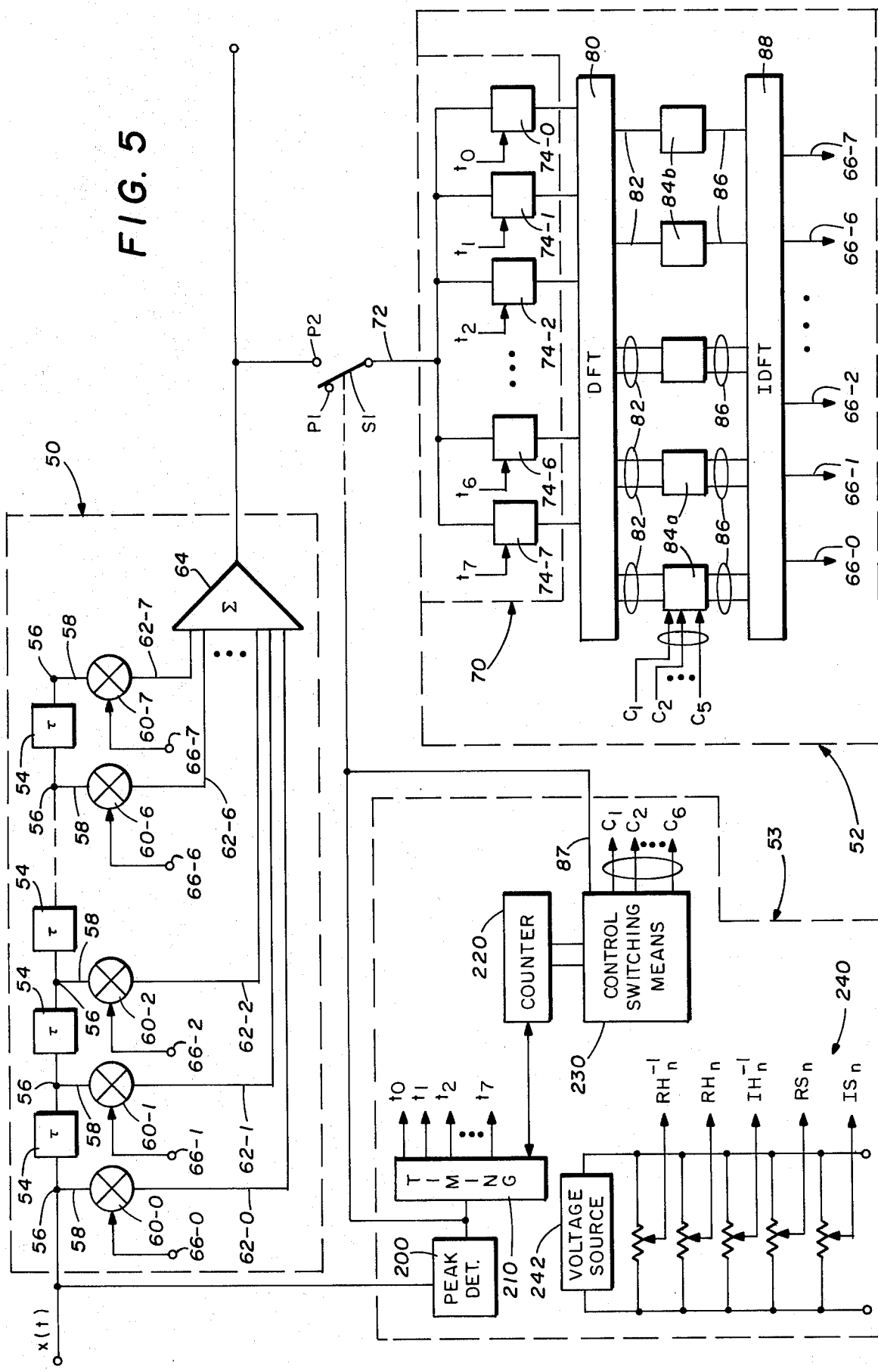
FIG. 5 is a block schematic diagram of the equalizer showing the frequency domain control circuits and the transversal filter for time domain adjustment.

FIG. 5 is a block schematic diagram showing the complete equalizer and comprises a transversal filter 50, frequency transformation and control apparatus 52 and timing and switching means 53. The transversal filter 50 is essentially a tapped delay line having adjustable tap gains with outputs summed to form a single output. The transversal filter comprises a plurality of delay segments 54, each having a uniform delay, $\tau$, and each segment separated by a tap 56. Lines 58 connect each tap 56 to a corresponding one of a plurality of multipliers 60. In the example illustrated $N=8$ taps are provided and individual multipliers are labelled 60-0, 60-1 . . . 60-7. The outputs of multipliers 60 are connected via lines 62 (62-0 . . . 62-7) to a summing amplifier 64. The multiplication factor for multipliers 60 is controlled by signals along lines 66 (66-0 . . . 66-7) which originate from the frequency transformation and control apparatus 52.

The frequency transformation and control apparatus 52 comprises sampling means 70 which is connected to receive the output of the transversal filter 50 via a switch S1 and a line 72. Sampling means 70 comprises a plurality of sample and hold circuits 74 (designated individually 74-0 . . . 74-7) which are each gated to sample and store a portion of the transversal filter output signal. A plurality of clock signals $t_0, t_1 \ldots t_7$ are supplied to sequentially gate the sample and hold circuits 74-0 . . . 74-7 respectively. The time interval between each gating pulse ($t_2-t_1$, for example) is chosen to be the same as the delay within each delay segment 54, namely, $\tau$. Consequently, the sample and hold circuits 74 store sample sets from the transversal filter 50 wherein each sample set contains values displaced in time by an amount $\tau$.

Sample and hold circuits 74 have output terminals which supply signals corresponding to the sample set values to an analog discrete Fourier transform circuitry 80. The analog DFT circuitry 80 may comprise, for example, the circuit shown in FIG. 2 or, equivalent, the circuit corresponding to section 7 of the tree graph shown in FIG. 4. The output of the DFT circuitry 80 is fed along lines 82 to the control circuits 84a and 84b. The control circuits correspond to section 9 of the tree graph diagram of FIG. 4, and provide the actual calculation within the frequency domain to achieve the correction factor desired. The output of the control circuits 84a and 84b are spectral coefficients derived from the input signals and are fed along line 86 to the analog IDFT circuitry 88. The analog IDFT circuitry 88 comprises, for example, the circuitry corresponding to the tree graph of FIG. 3 wherein each node is replaced by an appropriate operational amplifier similar to the analog DFT circuitry of FIG. 2.

The output of the analog inverse DFT is fed along lines 66 to the transversal filter 50, and specifically lines 66-0, 66-1 . . . 66-7 are connected as multiplying parameters or gain setters to respective multipliers 60-0, 60-1 . . . 60-7.

The timing and switching means 53 comprises a peak detector 200, timing means 210, counter 220, control switching means 230 and reference voltage generating means 240. Peak detector 200 detects the reception of the training pulse and activates switch S1 to connect the frequency transformation and control apparatus 52. Peak detector 200 also activates timing means 210 to supply clock pulses $t_0 \ldots t_7$ to the sampling means 70. The timing means also supplies clock signals to counter 220 which is triggered after completion of each sampling sequence to count the phase of the initialization process. The counter 220 supplies signals to the control switching means 230 to enable appropriate actuation of switches within the control circuits 84a and 84b via the control lines $C_1 \ldots C_6$. Additionally, control switching means 230 disconnects the frequency transformation and control apparatus 52 by opening switch S1 via line $C_7$ upon completion of the initialization process. Reference voltage generating means 240 comprises a plurality of potentiometers connected to a voltage source 242. For each value of $n=0, 1 \ldots N/2$, appropriate voltages $RH_n^{-1}$, $RH_n$, $IH_n^{-1}$, $RS_n$ and $IS_n$ may be derived for use in the control circuits 84. The potentiometer settings may be derived off-line and set based upon the results of numerically calculated values.

In the description herein, it is understood that although switching means may be shown as single pole double throw switches, solid state switching devices such as, for example, transistors may commonly be employed with appropriate control signals along lines $C_1 \ldots C_7$ from control switching means 230.

The control circuits 84d of the frequency transformation and control apparatus 52 are shown in FIGS. 6–9. Each control circuit 84a is identical in configuration, and has switch settings operated during the three phase setup procedure as shown, for one such circuit 84a, in FIGS. 6–9. Control circuits 84b, however, have only real inputs and thus do not contain any apparatus which operates on imaginary input spectral components or which provides imaginary output spectral components. Consequently, control circuits 84b comprises only apparatus to the left of dotted lines M—M shown in FIGS. 6–9. Operation of the control circuits 84b is, however, identical to the operation of the control circuits 84a during all phases of the initialization process.

Figure 6:
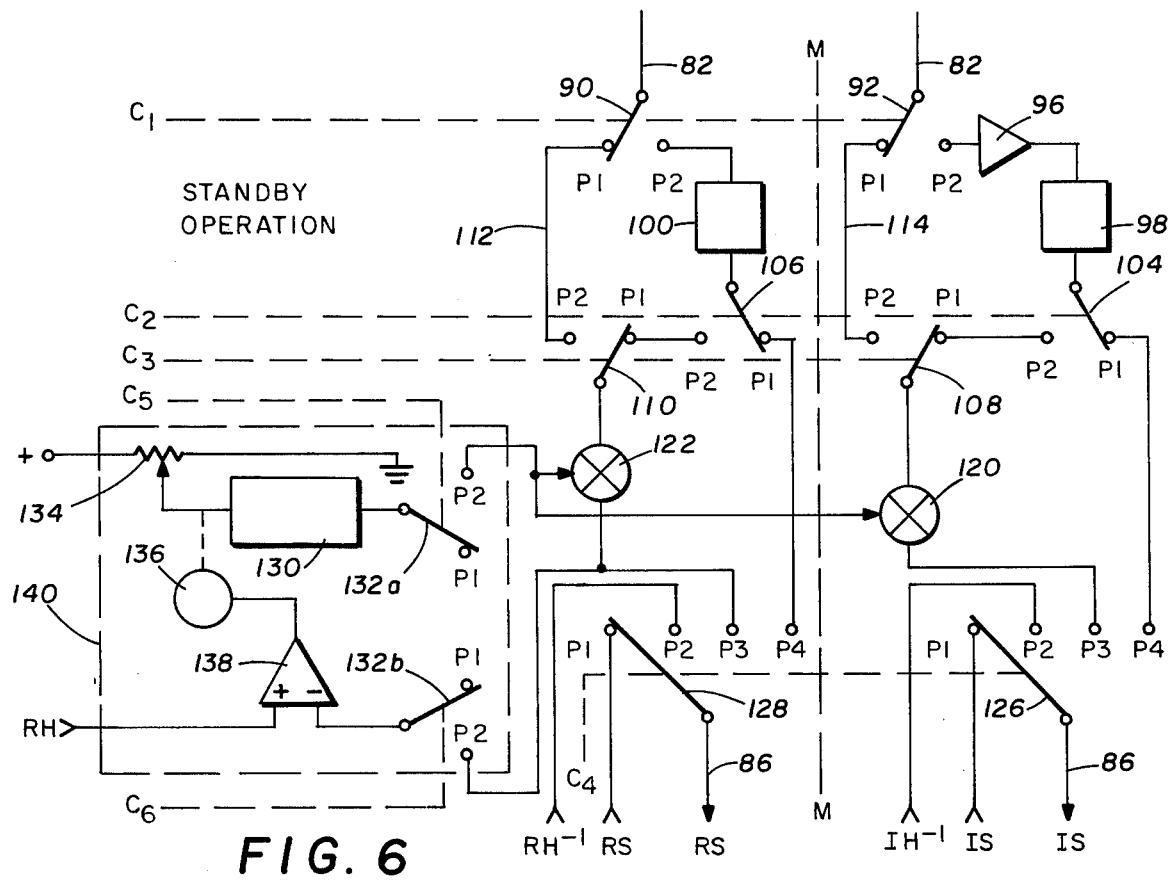
FIG. 6 is a block schematic diagram of the frequency domain control circuits in the standby condition.

FIG. 6 shows the initial standby condition of a typical control circuit 84a. Control circuit 84a comprises incoming lines 82 which provide signals from the analog DFT circuitry 80. Lines 82 are connected to input switching means 90 and 92 which are ganged together and operable by control switching means 230. Switching means 90 and 92 have two operable positions designated by P1 and P2. Switch position P2 of switching means 92 is operable to connect the incoming signal along line 82 to an inverter 96 which signal is subsequently fed to a storing means 98. A counterpart storing means 100 is provided to store a signal fed from the analog DFT circuitry 80 through the P2 position of switch 90. The output of storing means 98 and 100 are connected to switching means 104 and 106 respectively which have switch positions labelled P1 and P2. Switching means 104 and 106 together with switching means 108 and 110 are controlled by the control switching means 94 as indicated. Lines 112 and 114 serve to connect input switching means 90 and 92 with switching means 110 and 108 respectively.

Switching means 108 and 110 are connected respectively to multipliers 120 and 122 which are in turn connected to output switching means 126 and 128. Output switching means 126 and 128 have switch positions P1 ... P4 for providing signal outputs to the analog IDFT circuitry 88. The output switching means 126 and 128 are controlled by the control switching means 230 via line $C_4$ as indicated. Multipliers 120 and 122 are connected to receive the output of a storing means 130, via a switching means 132a having an open position P1 and closed position P2. The input to storing means 130 is from a voltage divider network comprising a potentiometer means 134. The potentiometer means 134 is controlled by a motor 136 which is driven by the output of operational amplifier 138. One input to op amp 138 is from the reference voltage generating means 240 and provides a constant reference voltage corresponding to the value RH. The other input to the operational amplifier 138 is derived from the output of multiplier 122 via switching means 132b. Thus, storing means 130, switching means 132, potentiometer means 134, motor 136 and operational amplifier 138 form a feedback circuit 140 with the multiplier 122. Swithcing means 132a and 132b are controlled by control switching means 230 by lines $C_5$ and $C_6$ respectively.

The output switching means 126 and 128 are connected to receive various constant reference voltages and computed signal values. The P1 position of switch 128 connects a standby reference value designated RS to the analog IDFT 88. Similarly, the P1 position of 126 passes the reference value IS to the analog IDFT circuitry 88. The P2 position of switching means 128 feeds the reference value corresponding to the real part of the inverse of the ideal transfer function 1/H which is designated in the drawings by $RH^{-1}$. Similarly, the P2 position of switching means 126 passes the imaginary portion of the inverse of the ideal transfer function which is designated $IH^{-1}$. These reference values are obtained from the reference voltage generating means 240. The P3 position of switch 128 is connected to receive the output of multiplier 122, and similarly, the P3 position of switch 126 is connected to receive the output of multiplier 120. The P4 position of switching means 128 is connected to switching means 106 to receive the output of storing means 100, and the P4 position of switching means 126 is similarly connected to switching means 104 to receive the output of storing means 98.

It is emphasized that the control circuit shown in FIG. 6 is repeated each time for each real and imaginary pair derived from the analog DFT circuitry 80 as shown in FIG. 5. Consequently, the reference values may all be thought of as associated with a specific frequency channel namely, $RH_n$, $RH_n^{-1}$, $IH_n^{-1}$, etc. For simplicity, however, the frequency index has been omitted in the figures.

The operation of the control circuits is given below in reference to FIGS. 5–9 where the standby, and phase 1–3 operating modes are described. The standby condition of control circuit 84a is illustrated in FIG. 6 in which the control switching means 230 sets the position of the switches as illustrated. Prior to equalization the standby control signals RS and IS are fed to the IDFT circuits where they are transformed into the time domain and subsequently fed to the multipliers 60 of the transversal filter 50. These standby control signals enable signals to be received through filter 50 for use by apparatus downstream of the filter is desired. In this connection, the output from summing amplifier 64 may be utilized together with peak detector 200 (or in place thereof) to activate the timing means 210. These initial sync pulses are transmitted to mark the beginning of a training period. Upon receipt of the first training signal, the peak detector actuates the timing means 76 to supply timing signals $t_0, t_1 \ldots t_7$ to the sample and hold circuit 74 (FIG. 5). Generally, it is desirable to gate the sample and hold circuits at a time such that the peak of the training pulse is approximately in the center of the tapped delay line of the transversal filter 50. Additionally, the $t_1$ timing pulse is delayed by an amount $\tau$ relative to the $t_0$ pulse, the $t_1$ pulse by an amount $2\tau$, etc. The sample time spacing is the same as that of the tap spacings of the delay line. After a complete cycle of the timing means 210, counter 220 is actuated to control the control switching means 230 to provide appropriate switching for the phase 1 mode of initialization.

Figure 7:
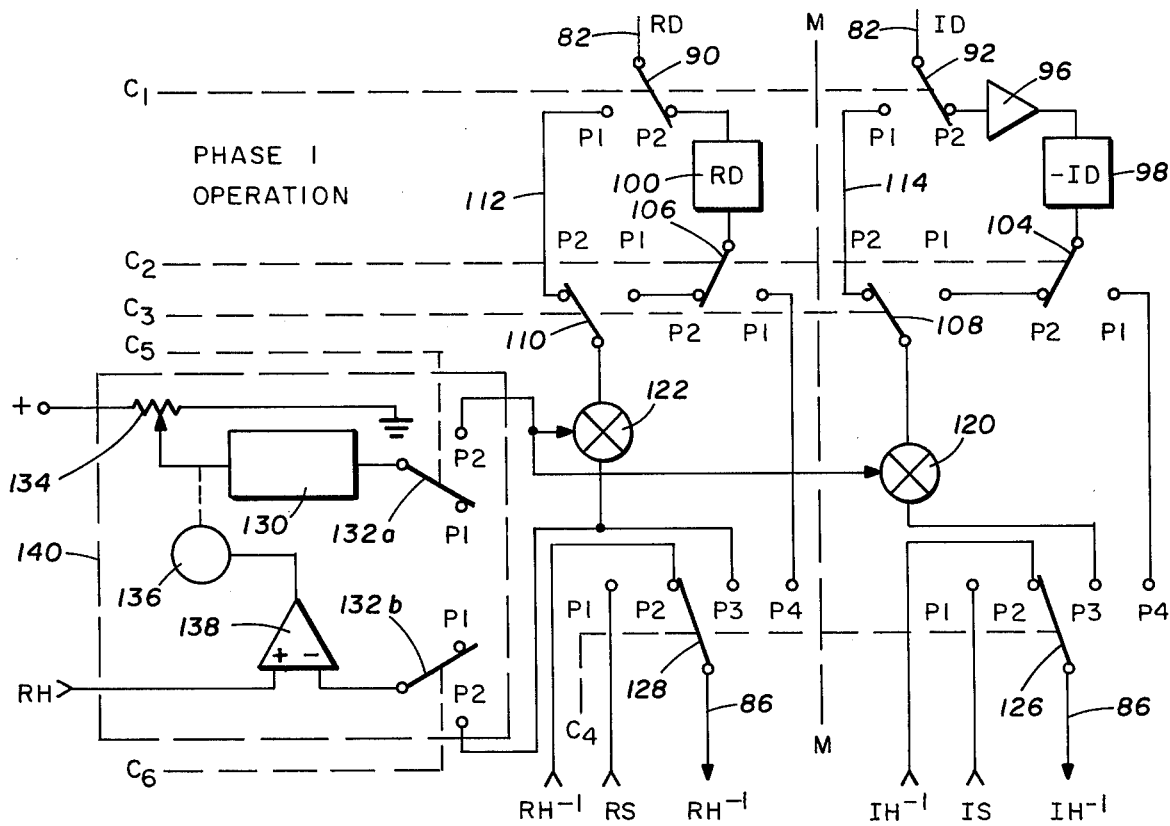
FIG. 7 is a block schematic diagram of the frequency domain control circuits in the phase one, setup condition.

In reference to FIGS. 5 and 7, control signals along line $C_1 \ldots C_6$ are provided by control switching means 230 to the control circuit 84a to position switching means 90, 92, 104, 106, 108, 110, 126, 128, 136a and 136b as shown. The output switching means 126 and 128 are set in their P2 positions to pass the real, $RH^{-1}$, and imaginary, $IH^{-1}$, portions of the reciprocal of the ideal transfer function respectively. The inverse DFT for the reciprocal ideal transfer function is calculated in circuitry 88 and the resulting output is utilized to set the tap gains of the transversal filter 50. Consequently, as per equation (3), the output of the summing amplifier 64 is simply $d(t) \leftrightarrow D(w)$. Time samplings of $d(t)$ are taken in the sample and hold circuit 74 and are fed to the analog DFT circuitry 80. The spectral coefficients $D(w)$ are then passed to the control circuits 84a and 84b. As shown in FIG. 7, the value RD is fed via the P2 position of switching means 90 to storing means 100, and the value ID is fed to inverter 96 via the P2 position of switching means 92. Inverter 96 simply changes the sign of the value ID and feeds this value to the storing means 98. As a consequence, storing means 98 and 100 together hold the value $D(w)$.

During phase 2, as shown in FIG. 8, the control switching means 230 provides signals to the switching means to position them as shown. The stored values corresponding to real and imaginary parts of $D(w)$ are fed via the P4 switch positions of switching means 128 and 126 to the analog IDFT circuitry 88, and the signal output values are subsequently fed to the multipliers 60 of transversal filter 50. As a consequence, the output of summing amplifier 64 has a spectral composition given by equation (4). FIG. 8 consequently shows the value RH $((RD)^2 + (ID)^2)$ fed along line 82 to the multiplier 122 via the P1 position of switching means 90, line 112, and the P2 position of switching means 110. Similarly, the value corresponding to IH $((RD)^2 + (ID)^2)$ is fed to multiplier 120 via the P1 position of switching means 92, line 114, and the P2 position of switching means 108. The output from multiplier 122 is connected to op amp 138 of the feedback circuit 140 via the P2 position of switching means 132b. Feedback circuit 140 is a servo system which provides an output voltage from amplifier 138 whenever the two inputs thereto are different. The output from op amp 138 drives motor 136 which in turn controls the potentiometer means 134 to provide a variable voltage to the storing means 130 and thence, via the P2 position of switching means 132a, to multiplier 122. Consequently, motor 136 will continue to drive the potentiometer means 134 until a null voltage is provided from op amp 138. When op amp 138 provides a null voltage the two inputs thereto are equal and consequently, the value stored in the storing means 130 is simply the factor $1/((RD)^2 + (ID)^2)$.

In FIG. 9, phase 3 of the initialization process is accomplished although no training pulses need be received during this phase. Upon completion of the sampling controlled by timing means 210, counter 220 serves to actuate the control switching means 230 to provide appropriate control signals along lines $C_1 \ldots C_6$ to activate the switches as shown in FIG. 9. The output switching means 128 and 126 now provide values $RD/((RD)^2 + (ID)^2)$ and $-ID/((RD)^2 + (ID)^2)$ to the IDFT circuitry 88 resulting from the multiplication of the value in storing means 130 with the values in storing means 100 and 98. These spectral coefficients are simply the real and imaginary portions of the inverse of the distortion transfer function as desired. Consequently, the time domain output values from the IDFT circuitry 88 are supplied to the taps of the transversal filter 50 to provide a time doman equilization for the distortion transfer function of the transmission channel. Once initialized, switching means S1 is open and the initialization circuitry, specifically, the frequency transformation and control apparatus 52, is disconnected from the output of the summing amplifier 64 of the transversal filter 50. The transversal filter 50 is thus initialized and ready to receive the message signals $x(t)$.

Figure 10:
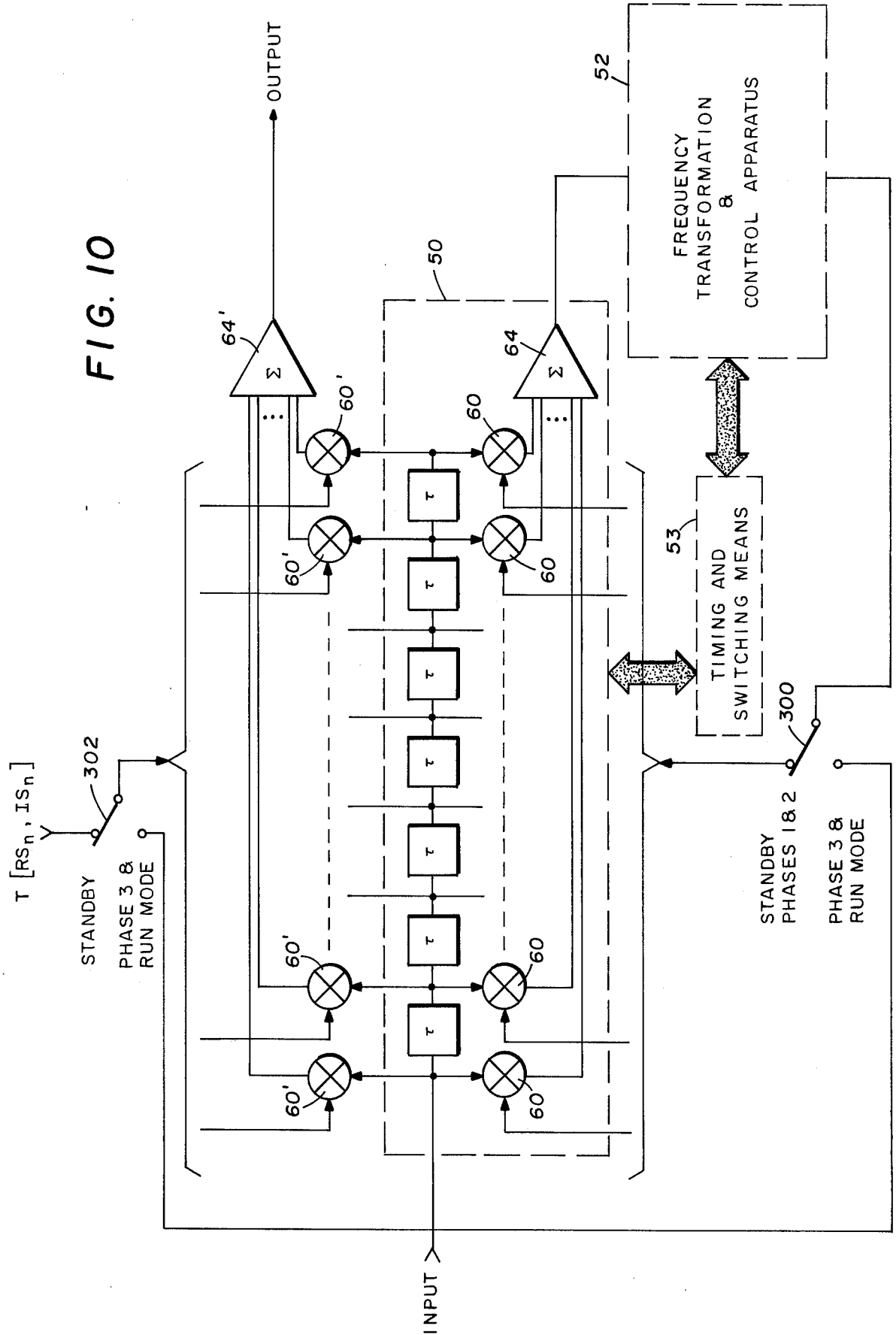
FIG. 10 is a block schematic diagram of an alternate embodiment of the equalizer of FIG. 5.

When the output signal from summing amplifier 64 is utilized to actuate the timing means and derive synchronizing pulses, the filter output disturbances during phases 1 and 2 of the initialization process may be eliminated by the apparatus shown in FIG. 10 wherein the setup transfer functions are not produced in the signal through path. FIG. 10 shows the transversal filter 50, frequency transformation and control apparatus 52 and timing and switching means 53 identical to the embodiment of FIG. 5. However, an additional set of taps is provided in FIG. 10 together with an additional plurality of multipliers 60' and an additional summing amplifier 64'. Switching means 300 and 302 are also provided to connect the output of the IDFT circuitry 88 to the multipliers 60 during the standby, phase 1 and phase 2 operations and to the multipliers 60' during the phase 3 and running modes of operation. The inverse transform of the initial control values $RS_n$ and $IS_n$ (represented by $T[RS_n, IS_n]$) are now provided to multipliers 60' during the standby period to enable undisturbed sync pulse transmission. The embodiment of FIG. 10 is particularly useful when the equalizer is utilized during message transmission to update the transfer function inasmuch as the setup transfer functions generated during phase 1 and phase 2 are not sent to apparatus downstream of the filter.

While the invention has been described with reference to a particular embodiment thereof it is apparent that modifications and improvements may be made by those of skill in the art without departing from the spirit and scope of the invention.

I claim:

1. An equalizer comprising:
   a. a transversal filter having a plurality of taps separated by time delay intervals $t$, said transversal filter receiving input signals from a transmission channel having a distortion transfer function $D(w)$ and an undistorted transfer function $H(w)$, said transversal filter providing output signals,
   b. means for sampling said output signals from said transversal filter at spaced time intervals $t$,
   c. means for transforming said sampled output signals into frequency representations thereof,
   d. means for providing frequency representations associated with the undistorted transfer function $H(w)$ of the transmission channel,
   e. means responsive to said frequency representations of said sampled output signals and said frequency representations associated with said undistorted transfer function for providing samples of a transfer function substantially equal to $1/D(w)$,
   f. means for converting said samples of said transfer function substantially equal to $1/D(w)$ into a time domain sample set, and g. means for applying said time domain sample set as weights for said taps for providing time domain equalization for said transmission channel.

2. An equalizer as recited in claim 1 wherein said means for transforming said sampled output signals into frequency representations comprise means for generating the discrete Fourier transform of said sampled output signals, and said means for converting said samples of said transfer function substantially equal to $1/D(w)$ into a time domain sample set comprises means for generating the inverse discrete Fourier transform.

3. An equalizer as recited in claim 2 wherein said transversal filter has N taps, where N is an even integer, said input signal is real, said means for sampling the output signal from said transversal filter comprises means for sampling N samples, each sample spaced by a time interval $t$, and said means for generating the discrete Fourier transform comprises means for generating spectral components $X_n$, where $n$ has values in one of the groups consisting of $n=0, 1 \ldots N/2$ and $n=0$, $N/2, N/2 + 1 \ldots N-1$.

4. An equalizer as recited in claim 3 wherein spectral components $X_0$ and $X_{N/2}$ are real.

5. An equalizer as recited in claim 1 wherein said means for providing samples of said transfer function substantially equal to $1/D(w)$ comprises means for generating samples of $D^*(w)/((RD)^2 + (ID)^2)$, where RD and ID are real and imaginary parts of the transfer function $D(w)$, and $D^*(w)$ is the complex conjugate of $D(w)$.

6. An equalizer as recited in claim 5 wherein said means for computing samples of $D^*(w)/((RD)^2 + (ID)^2)$ comprises:
   a. means for generating samples of $D^*(w)$ upon receipt of one input signal by said transversal filter,
   b. means for generating samples of $1/((RD)^2 + (ID)^2)$ upon receipt of another input signal by said transversal filter, and
   c. means for generating samples of the product $D^*(w) \cdot 1/((RD)^2 + (ID)^2) = 1/D(w)$.

7. An equalizer as recited in claim 6 wherein said means for generating samples of $D^*(w)$ comprises means for changing the algebraic sign of ID.

8. An equalizer as recited in claim 6 wherein said means for generating samples of $1/((RD)^2 + (ID)^2)$ comprises feedback circuit means for comparing a frequency representation of said received another input signal with a frequency representation of said undistorted transfer function $H(w)$.

9. An equalizer as recited in claim 6 wherein said one and another input signals comprise predetermined training signals.

10. An equalizer as recited in claim 6 wherein said transversal filter has N taps, and said means for sampling said output signals from said transversal filter comprises means for sampling N samples and said means for transforming said sampled output samples into frequency representations comprises means for generating spectral components, $X_n$, where, $n$ is a frequency index and $n=0, 1 \ldots N-1$, said equalizer further comprising means for storing a sample of $D^*(w)$ and $1/((RD)^2 + (ID)^2)$ for each value $n$.

11. An equalizer as recited in claim 10 wherein said means for transforming said sampled output signals comprises means for generating the discrete Fourier transform, said output signals are real functions of time and $n$ has values in only one of the groups consisting of $n=0, 1 \ldots N/2$ and $n=0, N/2, N/2+1 \ldots N-1$, where N is an even integer.

12. An equalizer as recited in claim 11 wherein spectral components $X_0$ and $X_{N/2}$ are real.

13. Apparatus for adjusting the tap gains of a transversal filter having an input and an output in equalizing distortion through a transmission channel upon response to a sequence of at least two predetermined training pulses, $H(w)$ being the undistorted transfer function of the transmission channel and $D(w)$ being the distortion transfer function and $H(w) \cdot D(w)$ being the transfer function of the transmission channel, said tap gains adjusted to correspond to a transfer function of the transversal filter substantially given by $1/D(w) = D^*(w)/((RD)^2 + (ID)^2)$, where,
   $D^*(w)$ is the complex conjugate of $D(w)$,
   RD is the real part of $D(w)$ and
   ID is the imaginary part of $D(w)$,
said apparatus comprising:
   a. means for setting the tap gains of said transversal filter to correspond to samples of the transfer function $1/H(w)$, whereby the output of said transversal filter has a frequency spectrum $H(w) \cdot D(w) \cdot 1/H(w) = D(w)$,
   b. means responsive to receipt of said first training pulse from said transversal filter for generating values corresponding to samples of $D^*(w)$ and for storing same,
   c. means for setting the tap gains of said transversal filter to correspond to samples of the transfer function $D^*(w)$ whereby the output of said transversal filter has a frequency spectrum $H(w) \cdot D(w) \cdot D^*(w) = RH((RD)_2 + (ID)^2) + jIH((RD^2 + (ID)^2)$ where $j = \sqrt{-1}$ and RH and IH are samples of the real and imaginary parts respectively of the undistorted transfer function $H(w)$,
   d. means responsive to receipt of said second training pulse from said transversal filter and to samples of said undistorted transfer function $H(w)$ for generating and storing values corresponding to samples of $1/((RD)^2 + (ID)^2)$,
   e. means for multiplying together said stored samples $D^*(w)$ and $1/((RD)^2 + (ID)^2)$ to obtain samples of $1/D(w)$, and
   f. means for setting the tap gains of said transversal filter to correspond to the samples of transfer function $1/D(w)$ whereby the time domain equalization of received signals from said transmission channel is produced in said transversal filter.

14. Apparatus as recited in claim 13 further comprising means for sampling an output of said transversal filter and for providing the discrete Fourier transform of said sampled outputs.

15. Apparatus as recited in claim 14 wherein said transversal filter has N taps spaced apart by a time interval $t$ and said sampling means comprises means for sampling N samples of said transversal filter output, each sample apart by a time interval $t$.

16. Apparatus as recited in claim 15 wherein means for setting the tapped gains of said transversal filter to correspond to samples of the transfer function $1/H(w)$ comprises means for generating samples of the inverse descrete Fourier transform of $1/H(w)$.

17. Apparatus as recited in claim 15 wherein said means for setting the tapped gains of said transversal filter to correspond to samples of the transfer function $D^*(w)$ comprises means for generating samples of the inverse discrete Fourier transform of $D^*(w)$.

18. Apparatus as recited in claim 15 wherein said means for setting the tapped gains of said transversal filter to correspond to samples of the transfer function $1/D(w)$ comprises means for providing samples of the inverse discrete Fourier transform of $1/D(w)$.

19. Apparatus as recited in claim 13 wherein said means for generating and storing values corresponding to samples of $1((RD)^2 + (ID)^2)$ comprises feedback circuit means for comparing a frequency representation of said second training pulse with samples of said undistorted transfer function $H(w)$.

20. A method of setting the tap gains of a transversal filter to equalize transmission channel distortions in received signals comprising the steps of:
  a. sampling outputs of said transversal filter at spaced time intervals equal to tap spacing intervals of said transversal filter,
  b. transforming said sampled outputs into frequency representations thereof,
  c. generating frequency representations associated with an undistorted transfer function of said transmission channel,
  d. in response to said frequency representations of said sampled outputs and said undistorted transfer function, generating samples of a transfer function corresponding to the inverse of the transmission channel distortion transfer function,
  e. converting samples of said inverse distortion transfer function into the time domain and generating corresponding time domain sample values, and
  f. applying the time domain sample values to the taps of said transversal filter.

21. A method as recited in claim 20 wherein the step of transforming said sampled outputs into a frequency representation comprises generating the discrete Fourier transform of said sampled outputs.

22. A method as recited in claim 21 wherein the step of converting samples of said inverse distortion transfer function into the time domain comprises generating the inverse discrete Fourier transform.

23. A method as recited in claim 20 wherein the step of generating frequency representations associated with an undistorted transfer function $H(w)$ comprises the step of generating frequency representations of the inverse undistorted transfer function $1/H(w)$.

24. A method as recited in claim 23, wherein said inverse distortion transfer function is represented by $1/D(w)$ and the step of generating sample values thereof comprises:
  a. means for setting the tap gains of said transversal filter to correspond to samples of the transfer function $1H(w)$, whereby the output of said transversal filter has a frequency spectrum $H(w) \cdot ^{D(}w) \cdot 1/H(w) = D(w)$,
  b. transmitting a first training signal through said transmission channel,
  c. generating samples of $D^*(w)$ upon receipt of said first training signal where $D^*(w)$ is the complex conjugate of $D(w)$,
  d. setting the tap gains of said transversal filter to correspond to samples of the transfer function $D^*(w)$ whereby the output of said transversal filter has a frequency spectrum: $H(w) \cdot D(w) \cdot D^*(w) = RH((RD)^2 + (ID)^2) + jIH((RD)^2 + (ID)^2)$,
  e. storing values corresponding samples of $D^*(w)$,
  f. transmitting a second training signal through said transmission channel,
  g. generating values corresponding to samples of $1/((RD)^2) + (ID)^2)$ in response to receipt of said second training signal and samples of said undistorted transfer function $H(w)$, and
  h. multiplying together said stored values corresponding to samples $D^*(w)$ and $1/((RD)^2 + (ID)^2)$ to generate samples of said inverse transverse function $1D(w)$.

* * * * *

UNITED STATES PATENT AND TRADEMARK OFFICE
CERTIFICATE OF CORRECTION

PATENT NO. : 4,027,258
DATED : May 31, 1977
INVENTOR(S) : Donald A. Perreault

It is certified that error appears in the above-identified patent and that said Letters Patent are hereby corrected as shown below:

Column 4, line 37, change equation (1) to read as follows:

$$Y_n = X_n \cdot C_n \quad n = 0, 1 \ldots N/2.$$

Column 5, line 37, change "D(w)" to --D*(w)--.

Column 5, line 38, change "D(w)" to --D*(w)--.

Column 5, line 55, change "D(w)" to --D*(w)--.

Column 9, line 25, change "D(w)" to --D*(w)--.

Column 12, lines 32-33, change the equation to read as follows:

$$H(w) \cdot D(w) \cdot D^*(w) = RH((RD)^2 + (ID)^2) + jIH((RD)^2 + (ID)^2)$$

Signed and Sealed this

Eighth Day of November 1977

[SEAL]

Attest:

RUTH C. MASON
Attesting Officer

LUTRELLE F. PARKER
Acting Commissioner of Patents and Trademarks